W. H. SELF.
PROCESS OF MAKING CHAFING BLOCKS FOR RAILWAY ROLLING STOCK.
APPLICATION FILED SEPT. 20, 1913.
1,111,807.  Patented Sept. 29, 1914.
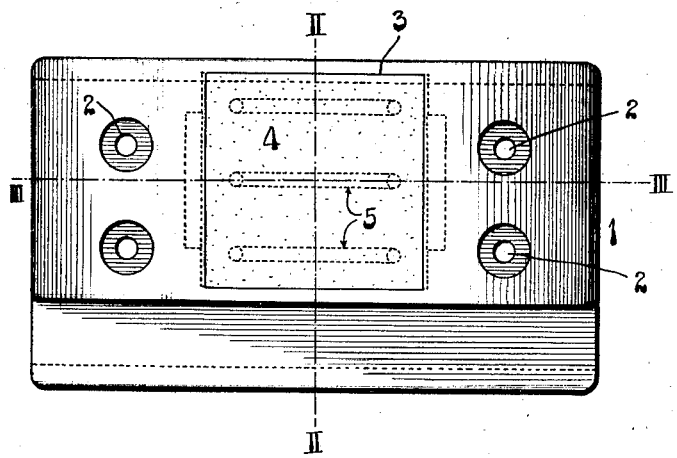
Fig. I.
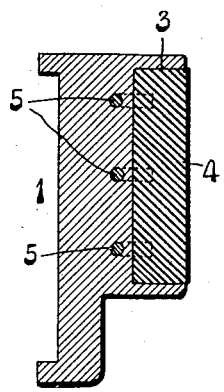
Fig. II.
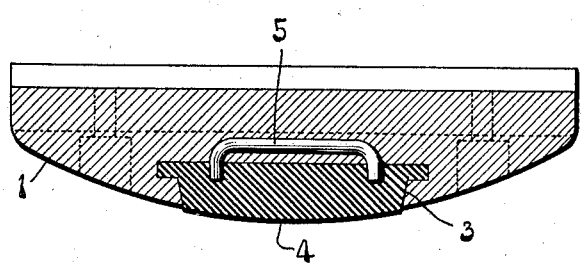
Fig. III.
Attest
a.g. m=Cauley
E. K. Clark.
Inventor:
W. H. Self
by Knight & Cook
Attys.

UNITED STATES PATENT OFFICE.

WILLIAM H. SELF, OF WEBB CITY, MISSOURI.

PROCESS OF MAKING CHAFING-BLOCKS FOR RAILWAY ROLLING-STOCK.

1,111,807.  Specification of Letters Patent.  Patented Sept. 29, 1914.

Application filed September 20, 1913. Serial No. 790,861.

*To all whom it may concern:*

Be it known that I, WILLIAM H. SELF, a citizen of the United States of America, and a resident of Webb City, in the county of Jasper and State of Missouri, have invented certain new and useful Improvements in Processes of Making Chafing-Blocks for Railway Rolling-Stock, of which the following is a full, clear, and exact description, reference being had to the accompanying drawings, forming a part of this specification.

My invention relates to a process of making chafing blocks for railway rolling stock, the block being one more particularly intended for use between a locomotive and its tender.

Chafing blocks of the kind to which my invention pertains have heretofore commonly comprised a block body in the form of a casting and a chafing plate of hard steel set into and bolted to the body block, the abutting faces of the chafing plate and the block body being machined to provide for the accurate fitting of the chafing plate into the body block.

My invention has for its object to provide a chafing block in the manufacture of which the machining of the chafing plate and the block body which receives it is dispensed with, and the production of bolt holes is also obviated, thereby lessening the expense of production; and it has for a further object the construction of the chafing block, including the chafing plate therein in such manner as to furnish a chafing or rubbing element which is much harder and much more durable than the similar elements in chafing blocks heretofore produced.

Figure I is a front elevation of my chafing block. Fig. II is a vertical cross section taken on line II—II, Fig. I. Fig. III is a horizontal section taken on line III—III Fig. I.

In the drawings: 1 designates the body of my chafing block, which may be, and preferably is, of gray iron, and is provided with bolt holes 2, for the reception of bolts by which the block is secured to the object intended to receive it. This block contains a pocket 3, in which the chafing plate, to be presently described, lies.

4 designates the chafing plate of my chafing block and 5 are bonds joining the chafing plate 4 to the body block 1, the said bonds being preferably of wrought iron and being embedded in part in the body block and part in the chafing plate. These bonds are preferably of U-shape, and are shown in the drawings with their bodies present in the body block 1 and their arms present in the chafing plate 4.

In the manufacture of my chafing block, I first cast the chafing plate 4 in one mold and thereafter cast the body block 1 in another mold into which the previously produced chafing plate is laid, whereby the chafing plate is cast to become embedded in and united with the body block casting, as will hereinafter more fully appear.

For the production of the chafing plate 4 of a desired degree of hardness, I preferably utilize a mixture of the following metals in the proportion given, which proportions, however, may vary to some degree without departing from my invention: Open hearth steel, 47%; ferro manganese, 3%; scrap iron, 40%; charcoal pig iron, 10%. This mixture of metals is rendered molten, and is poured into a suitable mold, in one section of which the bonds 5 have been previously set and, as a consequence, the chafing plate 4 is cast with said bonds embedded therein and extending from one face of the plate. In the mold in which the chafing plate 4 is cast, I place a cast iron chill, against which what is to be the wear resisting face of the chafing plate is cast; and, as a result, this face of the plate is rendered extremely hard, due to the chilling of the molten metal coming in contact with the chill in casting the plate.

I prepare a second mold in which the body block of my chafing plate is cast, this mold being made in a usual manner. The previously cast chafing plate 4 is heated to a dull red heat and placed quickly and properly within the second mold, and said mold is closed, after which the metal for the formation of the body of the chafing block is poured into said second mold and cast therein with the chafing plate, and its bonds 5 firmly and securely embedded in the block body, the molten metal of the body block structure burning into the chafing plate, and a mechanical union being obtained between the body block and the chafing plate.

By heating the chafing plate, as described, before casting the body block thereto, I provide for the two metals which are to be joined partaking of a more nearly uniform contraction when the body block casting cools than would be obtained if the chafing plate casting were not heated, as specified; and I, therefore, secure a much more perfect mechanical union than would otherwise be obtainable.

The bonds 5 entering into the structure of my chafing block are important elements, in that they serve to more effectually and firmly hold the chafing plate to the body block into which said plate is cast.

I claim:

1. The method of making chafing blocks which consists in casting a hard metal chafing plate onto the ends of a bond member so that the bond member is in the form of a loop extending from the inner face of said hard metal chafing plate, and casting a soft metal body block around the side edges and inner face of said hard metal chafing plate so as to embed the loop of said bond in the soft metal body block.

2. The method of making chafing blocks which consists in forming a hard metal chafing plate, heating said hard metal chafing plate so as to expand it, then placing the hot and expanded chafing plate into a mold, and thereafter pouring molten metal around the side edges of said hot and expanded chafing plate, substantially as described.

3. The process of manufacturing locomotive chafing plates consisting in providing a mold with a chill member therein, casting a semi-steel metal against the chill member and around the ends of substantially U-shaped members to form a chafing plate member; cooling the body thus cast; reheating same to a dull redness; and while in this state casting a softer metal on the chafing plate member and about the U-shaped members, to firmly unite the whole; and allowing same to cool, substantially as described.

4. The process of manufacturing locomotive chafing plates consisting in providing a mold with a chill member therein, casting a metal consisting substantially of 47 per cent. open hearth steel, 3 per cent. ferro-manganese, 40 per cent. scrap cast iron and 10 per cent. charcoal pig iron against the chill member and around and embedding the ends of substantially U-shaped members to form a chafing plate member; cooling the body thus cast; reheating same to a dull redness; and while in this state casting a softer metal on the chafing plate member and about the U-shaped members; to firmly unite the whole; and allowing same to cool, substantially as described.

WILLIAM H. SELF.

In the presence of—
J. H. GWATHMEY,
J. FRANKENBERGER.